W. S. BOYD, 3d.
Button for Boots and Shoes.

No. 222,124. Patented Dec. 2, 1879.

UNITED STATES PATENT OFFICE.

WILLIAM S. BOYD, 3D, OF PHILADELPHIA, PENNSYLVANIA.

IMPROVEMENT IN BUTTONS FOR BOOTS AND SHOES.

Specification forming part of Letters Patent No. 222,124, dated December 2, 1879; application filed October 18, 1879.

*To all whom it may concern:*

Be it known that I, WILLIAM S. BOYD, 3d, of Philadelphia, in the county of Philadelphia and State of Pennsylvania, have invented certain new and useful Improvements in Hooks, Eyes, and Buttons for Boots, Shoes, &c.; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to an improvement in hooks and eyes for boots and shoes, &c.; and it consists in the construction, combination, and arrangement of parts, as will be hereinafter more fully set forth, and pointed out by the claims.

Figure 1:
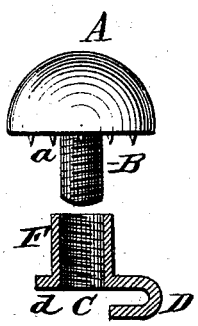
Figure 2:
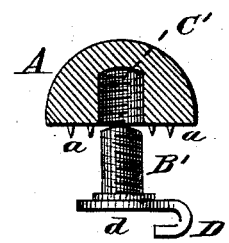
Figure 3:
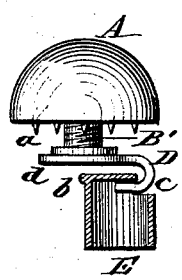
Figure 4:
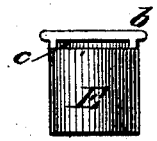
Figure 5:

In the annexed drawings, which fully illustrate my invention, Figure 1 is a side elevation, partly in section, showing the shank on the head. Fig. 2 is a side elevation, partly in section, showing the shank on the hook. Fig. 3 is a side elevation, partly in section, showing the hook attached to the eye. Figs. 4 and 5 represent, respectively, a side elevation and plan view of the eye.

A represents the head or button, which may be provided with the screw-threaded shank B or the threaded recess C', as shown. On the under side of this head or button are formed the sharp projections a.

F represents the hook, which may be provided with the screw-threaded collar C or the threaded shank B', as shown, and is provided at its base with a flange, d, on one side, and its other side extending outward, downward, and inward to form a hook, D, to engage with the eye E. This eye E is made tubular in form, having a head upon one end, which extends over the edge of the tubular portion and forms a flange, b. Part of the head and tubular portion are cut away on one side to admit the entrance of the hook D.

The operation of the device is as follows: An opening is made in the material on one side and the eye passed through, the flanges at the head preventing it from coming entirely through. The upper end is then mashed down or turned over, which holds the eye firmly in the material. An opening is then made on the opposite side of the material, and the shank passed through and screwed into the threaded opening in the hook or button, the sharp projections being drawn up firmly against the material, which prevents the device from turning.

Its advantages are, that it can be easily and cheaply constructed, it will dispense with the necessity of making button-holes, sewing, &c., and it can be readily adjusted at will.

The device may be of any desired shape and size, and may be fastened to the material in any other suitable manner.

Having thus fully described my invention, what I claim as new, and desire to secure by Letters Patent, is—

1. A hook and eye and button for boots, shoes, &c., consisting of the head A, having projections a and threaded shank B and threaded recess C', in combination with the hook F and eye E, substantially as and for the purpose set forth.

2. The head A, having projections a and threaded shank B and threaded recess C', in combination with the hook F, having threaded collar C and threaded shank B', flange d, and hook D, and the eye having flange b and cut-away portion c, substantially as and for the purpose set forth.

In testimony that I claim the foregoing as my own I have hereto affixed my signature in presence of two witnesses.

WM. S. BOYD, 3D.

Witnesses:
W. M. SHINNICK,
S. D. STOCKTON.